United States Patent [19]

Tan

[11] Patent Number: 4,510,600
[45] Date of Patent: Apr. 9, 1985

[54] DIGITAL SIGNAL TRANSMISSION SYSTEM

[75] Inventor: Yoichi Tan, Kanagawa, Japan

[73] Assignee: Fuji Xerox Co., Ltd., Tokyo, Japan

[21] Appl. No.: 437,718

[22] Filed: Oct. 29, 1982

[30] Foreign Application Priority Data

Oct. 30, 1981 [JP] Japan ............................. 56-172895

[51] Int. Cl.³ .............................................. H04J 3/00
[52] U.S. Cl. .................................................. 370/94
[58] Field of Search ...................... 370/60, 94, 89, 88

[56] References Cited

U.S. PATENT DOCUMENTS 4,320,500 3/1982 Barberis et al. .................. 370/94
4,399,531 8/1983 Grande et al. .................... 370/94
4,464,749 8/1984 Ulug ................................. 370/94

Primary Examiner—Douglas W. Olms
Assistant Examiner—Frank M. Scutch, III
Attorney, Agent, or Firm—Sughrue, Mion, Zinn, Macpeak and Seas

[57] ABSTRACT

In a time division multiplex cable communication system, each station transmits with its packet a designation code representing the propagation delay time between that station and a reference position on the cable to facilitate calculation of the proper transmission timing.

7 Claims, 5 Drawing Figures

DIGITAL SIGNAL TRANSMISSION SYSTEM

BACKGROUND OF THE INVENTION

The present invention relates to a digital signal transmission system for effecting data transmission in a time division multiplex mode by using a communication cable, and particularly relates to a digital signal transmission system in which the sending timing of a packet signal onto the communication cable from each station is regulated in accordance with the guard time.

As the use of computers has spread and as digital signal processing techniques have progressed, a data communication technique has moved into the limelight in which a communication system and a data processing system are combined so as to enable information to be processed by on-line processing. As a small-scale communication system, such as a private communication system installed in the precincts of government and public agencies, companies, or the like, such a communication system in a packet form using a communication cable, e.g. a coaxial cable, attracts public attention due to its low cost, high reliability and high transmission efficiency.

In such a packet-form communication system, a number of personal stations are connected to a communication cable for effecting bi-directional transmission to and from a computer disposed in a laboratory or the like so that messages each divided into data blocks of 1,000 to 2,000 bits may be transmitted from each station. Each message is additionally provided with a header containing its designation, running number or the like. In this communication system, control functions are completely distributed to the respective stations and therefore the network per se is a mere passive transmitting medium having no control function. Accordingly, each station begins transmitting a message after it confirms that the transmission line is available when interference with a packet from another station occurs during the transmitting operation, both the concerned stations stop their transmitting operations. Each of the stations which has stopped its transmitting operation will then try to transmit the message again after a random queuing time.

In such a communication system, any user at any station not only can access one and the same computer but also can utilize any hardware such as a memory or any software such as a program among the hardware and software distributed amongst the plurality of stations. That is, in this communication system, devices such as high speed or high accuracy printers, large scale files, or the like, which have been concentrated at the location of a large central computer in a time sharing system, may be utilized substantially equally by all stations. Thus, it becomes possible not only to economize resources and to improve practical efficiencies but also to develop a large-scaled software system due to the accommodation of programs and data. Further, in such a communication system, there is no priority in using the transmission line among the users or personal stations. Accordingly, there is no master and slave relationship which is often provided in other systems, so that communication may be carried on between any among the connected stations. Further, since the transmission line such as a coaxial cable is constituted by a complete passive circuit, a highly reliable system may be easily provided.

While this communication system has various advantages, but there is a possibility in this system that packets will interfere with each other on the same transmission line since each station may begin transmitting data at any time. Such interference between packets will become significant as the operating efficiency of the transmission line becomes higher.

To solve such a problem, there have been proposed a number of signal transmission systems such as the so-called "priority Ethernet" and "Reservation Ethernet" Systems. In the former system, the priority of signal transmission of each station is indicated in the preamble portion of the packet so that, in case interference occurs between packets from different stations, one of the packets having higher priority is allowed to be transmitted preferentially. In the latter system, a master station which indicates the operation mode is always set so as to confirm whether each of the other, personal stations has a signal in a reserved mode waiting to be transmitted and the amount of information to be transmitted. As a result, the master station determines in every frame the order of packets to be transmitted by the respective stations so as to allow signals to be transmitted in time division multiplex in the transmitting operation mode.

In the former proposed signal transmission system, however, there is still a problem of variations in signal transmission delay time due to interference among packets having the same priority. Accordingly, this system is not suitable for real time transmission, such as conversational sound communication, in which importance is attached to the real time correspondency between transmitting and receiving operations.

In the latter signal transmission system, however, the above-mentioned inter-station equality is lost because of the existence of the master station. That is, in this system, data communication must be stopped if any failure occurs in the master station, and in this sense the system reliability suffers.

In order to solve this problem, there has been proposed a digital signal transmission system in which real time transmission can be effected without losing the equality among personal stations. In this system, a frame which is cyclically repeated along the time axis is subdivided on the same time axis into a plurality of blocks so that each personal station may be given an opportunity for packet communication within the block. Thus, each station not only may have an equal opportunity to use an empty block but can also effect real time transmission because an opportunity for signal transmission is given periodically in every frame if the station occupies a certain block for a long enough period of time for the signal transmission.

FIG. 1 shows the frame configuration used in the system as mentioned directly above. A frame cyclically repeated on the time axis is constituted by N blocks #1 to #N. Each block is constituted by various bit strings $b_1$ to $b_9$ as follows:

$b_1$ . . . backward guard time;
$b_2$ . . . preamble;
$b_3$ . . . start flag;
$b_4$ . . . address bit string;
$b_5$ . . . control bit string;
$b_6$ . . . information bit string;
$b_7$ . . . check bit string;
$b_8$ . . . end flag; and
$b_9$ . . . forward guard time.

The bit strings $b_2$ to $b_5$ and $b_6$ to $b_8$ are necessary to constitute a packet and are generally referred to as overhead or additional bits. Intervals b1 and b9 are generally referred to as guard time. That is, the guard time is an empty string for avoiding the situation that adjacent packets overlap with each other due to the delay time which may occur when the packets of each block propagate on the coaxial cable. The backward guard time $b_1$ is for protecting the rear packet from such an overlap situation, while the forward guard time $b_9$ is for protecting the forward packet in the same manner. The number of total bits of the backward guard time $b_1$ and the forward guard time $b_9$ is represented by g and the guard time $(b_1+b_2)$ is represented by $\tau_g$.

In this proposed digital signal transmission system, if no station is sending signals, any station can begin to send out such a frame configuration signal as described above at any time. A station which has first begun to send out a signal onto the communication cable takes the initiative of frame synchronization.

Once the frame synchronization has been established in this manner, all stations can monitor the status of signals transmitted on the communication cable. The user equipment at each station is provided with a memory for indicating the occupation status of the respective blocks in every frame so that the respective blocks are registered in accordance with the received packet signal of each station. When another station sends out a packet signal after the frame synchronization has been established, the station first searches for an empty block in accordance with the contents of the memory, occupies the block to prevent other stations from transmitting in that block, and times its own with the thus occupied block.

In this case, however, the timing for the initiation of signal transmission becomes a problem. For example, as shown in FIG. 2, assume that a station C is located at a longitudinally central portion of coaxial cable 3 which is connected at its opposite ends to impedance matching terminators 1 and 2, and another station S located between the station C and the terminator 1 is now transmitting. In this case, the packet signal sent out from the station S may be received by the station C and further stations $R_1$ and $R_4$ on the coaxial cable 3 at different points of time depending on the signal propagation delay time on the cable. Accordingly, if each station sends out its own signal with no consideration for this delay time, there may develop a situation wherein adjacent packets on the coaxial cable 3 overlap with each other.

To prevent such a serious situation from occurring, this proposed system utilizes the concept of above-mentioned guard time $\tau_g$. That is, the guard time $\tau_g$ in this system is set to be equal to or more than twice the signal propagation delay time between the central station C, which is regarded as a positional reference, and the farthest station, and signal transmission from each station is controlled such that the packet signals transmitted from the respective stations may be arranged equidistantly in a row at the receiving position of the station C.

This feature will be more particularly described by referring to FIG. 3. Assume now that the station S has completed its signal transmission and other stations R1 to R4 are going to begin transmitting their packet signals. In this case, each of the succeeding stations $R_1$ to $R_4$ determines the timing of its own packet signal transmission such that its transmitted packet signal will be received at the reference station C at a point in time which is one guard time after the station C completes its reception of the packet signal transmitted from the preceding station S (transmitted S packet). For the determination of the signal transmission timing, each station considers the positional relationship on the cable among all the stations connected to the cable. When the packet signal transmitted on the cable is received by a station, the station identifies the fact that the packet received is from the station S (received S packet) on the basis of the address bit of the received S packet, and determines the time when the received S packet will terminate at the station C on the basis of the positional relationship between the location of the station and the location of the reference station C and also on the basis of signal propagation delay time between the same two stations. The received S packet ending time at the station C will be later than that at the station $R_1$ and $R_2$ and earlier than that at the stations $R_3$ and $R_4$.

When the received S packet ending time with respect to the reference station C has been determined by each of the succeeding stations $R_1$ to $R_4$, any one of the succeeding stations $R_1$ to $R_4$ which desires to send out its own signal begins to send out a packet signal (transmitting R packet) at a time earlier than the abovementioned received S packet ending time at the station C by the signal propagation delay time from the one station to the station C. The reception of the packet signal sent out in this manner (receiving R packet) will begin at the station C at a point in time which is later than the receiving S packet ending time by the guard time $\tau_g$.

The signal transmission timing is controlled by establishing frame synchronization and block synchronization. That is, each station periodically resets with predetermined timings both a block counter and a frame counter for counting clock signals produced by an intraoffice clock generator, thereby establishing frame synchronization as well as block synchronization within the error range of the clock signal frequency.

For example, at the station $R_3$ which is disposed beyond the station C when viewed from the station S, the above-mentioned counters are controlled such that the second block #2 is initiated at a time later than the receiving S packet ending time by a period of time $\tau_{b9}$ (which is referred to as "forward guard time") which can be calculated by the following equation (1)

$$\tau_{b9} = \tau_g/2 - \tau_{CR3} \tag{1}$$

where $\tau_{CR3}$ represents the signal propagation delay time between the station C and the station $R_3$.

For the station $R_2$ which is located between the station S and the station C, the forward guard time $\tau_{b9}$ is expressed by the following equation (2):

$$\tau_{b9} = \tau_g/2 + \tau_{CR2} \tag{2}$$

where $\tau_{CR2}$ represents the signal propagation delay time between the station C and the station $R_2$.

Similarly, at the station $R_1$ which is located beyond the station S when viewed from the station C, the forward guard time $\tau_{b9}$ is expressed by the following equation (3):

$$\tau_{b9} = \tau_g/2 + \tau_{SC} - \tau_{SR1} \tag{3}$$

where $\tau_{SC}$ and $\tau_{SR1}$ represent the respective signal propagation delay times between the stations S and C and between the stations S and $R_1$.

Thus, in the previously proposed digital signal transmission system, it has been necessary to determine forward guard time which is the time lapse from the completion of reception of the packet (herein after referred to as a "master packet") sent out from a station taking the initiative for frame synchronization to the commencing of the next block, on the basis of a selected one of the above-mentioned equations (1) to (3). In each station, the forward guard time $\tau_{b9}$ determined in accordance with the relationship with respect to other stations is stored in memory means such as a read only memory (ROM). Each station can obtain a signal corresponding to the forward guard time $\tau_{b9}$ from the output terminal of the thus prepared memory means by applying the designation, or identity, of the master packet to the address terminal of the memory means. The thus obtained forward guard time signal is then applied to a programmable timer, for example, the output of which then resets the above-mentioned counters so as to establish the frame synchronization and block synchronization. The programmable timer is a general purpose circuit which may be started when it is applied with the above-mentioned signal corresponding to the forward guard time $\tau_{b9}$ and which may then indicate, by the rising or falling edge of its output signal, the lapse of a forward guard time from the started point of time.

In this proposed system, however, the contents of the translation tables are not only different one from another in the respective stations but also increase dramatically as the number of stations increases. Accordingly, the design and/or the production of the memory means such as a ROM for storing the translation table requires many steps, resulting in a serious deterrent to practical use of a communication system to which the proposed system is applied.

SUMMARY OF THE INVENTION

To solve the problems mentioned above, an object of the present invention is to provide, in a communication system in which each station individually determines the transmission timing of its own packet, a digital signal transmission system in which the frame synchronization as well as the block synchronization can be established without using a table of relationships with respect to distant stations.

According to the invention, a distance code definitely depending on the inter-station signal propagation delay time on a communication cable is included in the designation code of a packet sent out from a station so as to enable the iner-station signal propagation delay time to be calculated from the designation code to thereby establish the system timing, thereby attaining the above-mentioned object of the present invention.

BRIEF DESCRIPTION OF THE DRAWINGS

A preferred embodiment of the present invention will be now described with reference to the accompanying drawings, in which.

DETAILED DESCRIPTION OF THE PREFERRED EMBODIMENT

Figure 4:
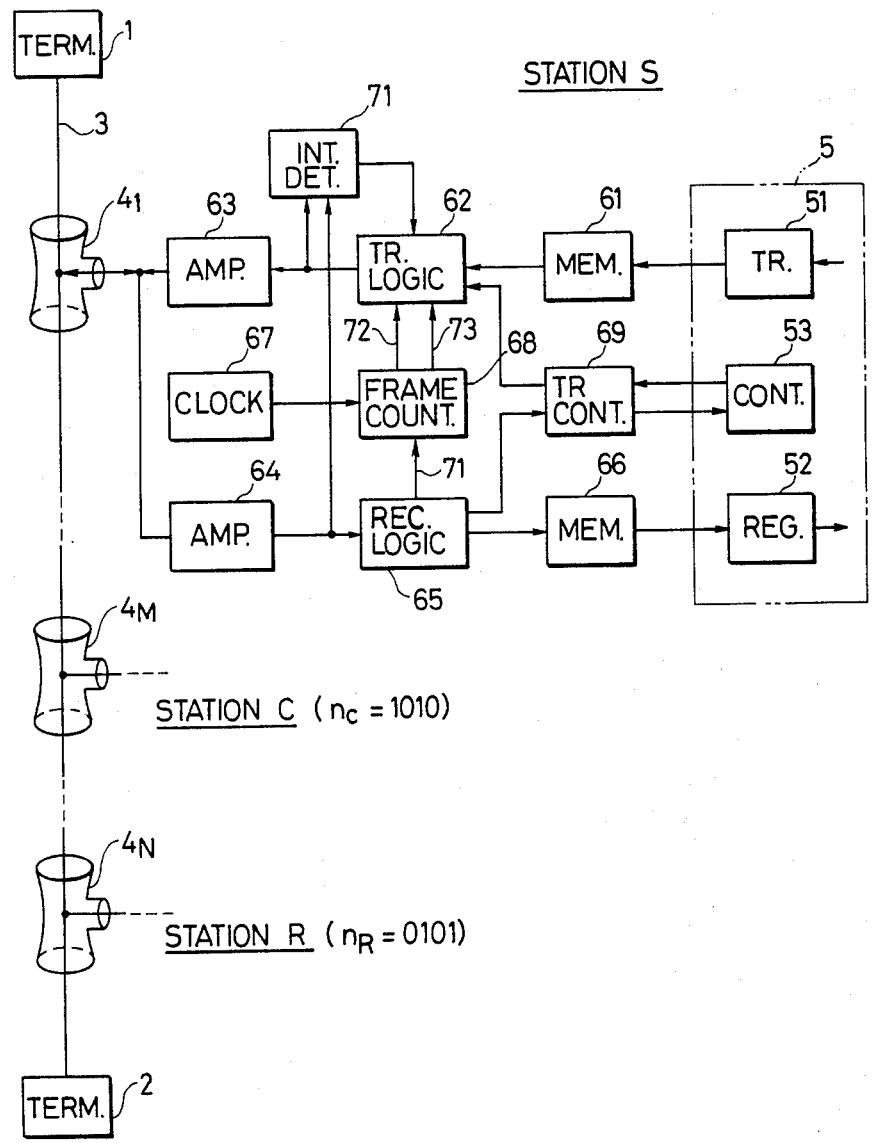
FIG. 4 is a schematic block diagram of the communications sytem according to an embodiment of the present invention.

FIG. 4 is a schematic block diagram of a communication system as an embodiment of the digital signal transmission system according to the present invention. In this communication system, a coaxial cable 3 for providing a transmission line is connected at its opposite ends to respective impedance matching terminators 1 and 2 each having a resistance value which is equal to the characteristic impedance. The respective stations are connected to the coaxial cable 3 through taps $4_1$ to $4_N$ (signal input/output points). Since each of these stations basically has the same construction, the major part of only a station S connected to the tap $4_1$ is illustrated in FIG. 4.

Each station is provided with a user equipment 5 which comprises a computer and a telephone unit. The user equipment 5 further comprises a transmitter (or an encoder) 51 for transmitting a digital signal in a packet unit to another station, a receiver (or a decoder) 52 for receiving a digital signal also in a similar packet unit transmitted from another station, and a terminal controller 53 for controlling the terminal. The output signals from the transmitter 51 are temporarily stored in a transmitting buffer memory 61 and then simultaneously read out therefrom at a predetermined time in response to a clock signal applied thereto at the same rate as the transmission rate on the transmission medium or coaxial cable 3. The read-out signals are converted into a predetermined packet form by a transmitting logic circuit 62 and then sent out onto the coaxial cable 3 through the tap $4_1$ after passing through a transmitting buffer amplifier 63.

All the packet signals transmitted onto the coaxial cable 3 are received by a receiving buffer amplifier 64 through the tap 41. A receiving logic circuit 65 selects only the packet signals addressed to its own station S out of all the received packet signals and then temporarily stores them in a receiving buffer memory 66. The stored signals are successively read out by a receiver 52 in response to given clocks so as to provide a receiver output signal.

The transmission signals which are used in transmitting/receiving signals as mentioned above, are generated by a transmission clock generator 67. A frame counter 68 frequency-divides the transmission clock signals to provide block timing and frame timing. A transmission control circuit 69 controls the terminal controller 53 in accordance with the received signal obtained from the receiving logic circuit 65 and addressed to its own station S on the one hand, and controls the transmitting logic circuit 62 in accordance with the instructions of the terminal controller 53. An interference detecting circuit 71 checks whether or not any interference has occurred with any other station when a first packet of a block selected by its own station has been sent out.

In the digital signal transmission system, codes definitely concerned with the signal propagation delay time on the coaxial cable 3 are used as the designation numbers $N_S$, $N_C$, $N_R$ for the respective stations S, C and R. For example, in FIG. 4, assuming that the terminator 2 disposed in the lower portion of the drawing is used as a reference point, the respective signal propagation delay times in accordance with the distances from the reference point or the terminator 2 to the respective taps $4_1$ to $4_N$ on the coaxial cable 3 extending upward from the terminator 2 are coded as the designation codes. Thus, the signal propagation delay time between any two stations may be expressed by a difference between the respective designation numbers of both the stations. In practice, the duration of one bit of a digital signal to be transmitted on the coaxial cable 3 may be used as a standard unit for the coded designations. For example, assume that there is a distance of 100 meters from the terminator 2 to the tap $4_N$ of the station R which is intending to occupy the second block #1, and a distance of 200 meters from the same terminator 2 to the tap $4_M$ of the station C which is deemed as a reference station, and further assume that the signal propagation delay time on the coaxial cable 3 is 5 ns/m (nanoseconds per meter) and that the signal transmission rate is 10 Mb/sec (megabits per seconds). In this case, the length of one bit corresponds to a time period of 100 ns. If the respective distances from the stations R and C to the taps $4_N$ and $4_M$ are negligible, the designation codes $N_R$ and $N_C$ included in the respective designation numbers for the stations R and C may be represented by the following bit numbers:

$N_R = 5$ (bits), $N_C = 10$ (bits)

Accordingly, these codes $N_R$ and $N_C$ may be expressed in binary codes as follows:

$N_R = 0101$, $N_C = 1010$

If the guard time $\tau_g$ as well as the designation distance code $N_S$ for the station S which is occupying the first block #1 are expressed in those bit units in a similar manner, the calculations of the above-mentioned equations (1) to (3) may be simple binary calculations. The receiving logic circuit 65 comprises a calculating circuit for calculating a forward guard time $\tau_{b9}$ and a programmable timer, so that it produces a reset signal 71 at a time corresponding to the lapse of the forward guard time $\tau_{b9}$ after the completion of the receiving S packet. The reset signal 71 is then applied to the frame counter 68 to reset the same. Thus, the block timing 72 and the frame timing to be supplied to the transmitting logic circuit 62 are synchronized with each other.

In order to improve the synchronization accuracy, a decimal point may be used in the designation distance code. For example, assuming that the distance is 105 meters from the terminator 2 to the station R, the designation distance code $N'_R$ may be expressed by using a decimal point as follows:

$N'_R = 5.25$ (bits) $= 0101.01$ (binary number)

Further, in the case where the reciprocal of the signal transmission rate, i.e., the length of one bit, is used as the standard unit for the designation distance code, the output of the intra-office transmission clock generator 67 may be commonly used for the programmable timer used in the receiving logic circuit 65. To enhance the accuracy of the programmable timer, it will suffice to cause the transmission clock generator 67 to oscillate with a higher frequency, with the output of the generator 67 being frequency divided by a frequency divider and then supplied to the frame counter 68. For example, when a resolution accuracy of ¼ bit (in this case, the distance of 5 m corresponds to the time 25 ns) is required, the transmission clock generator 67 is caused to oscillate at a frequency which is 4 times as high as that required by the frame counter 68. The output of the generator 67 is used as a clock for the programmable timer on the one hand and at the same time the frequency thereof is divided into four so as to be used as a clock for the frame counter 68 on the other hand.

After the respective timings of the block and frame have been synchronized with each other in each station in the manner described above, the point of time at which the succeeding station R begins to transmit its packet signal is set to be the time which has elapsed from the starting time of the second block #2 by a period of time obtained by subtracting the signal propagation delay time between the stations R and C from one half of the guard time, i.e., $\tau_g/2$.

After the earliest station S, which has been performing so far its duties as the master station, has completed its transmitting operation, the first block #1 becomes empty and the station R which has been using the second block #2 will perform as the master station in place of the station S. Namely, at this time, the frame counter 68 may free run without being reset in synchronism with the frame of station S. Each of all the stations other than the station R, including the station S, forms a new reset signal 70 from the packet signal of the station R, thereby resetting the intra-office frame counter 68. In this manner, the master station shifts successively from one station to another, so that it is possible to maintain the synchronization between the blocks and frames in the whole system. To this end, an additional bit in each packet may be for the statement assigned for indicating whether the sending station is the master station or a slave station. This is not, however, an essential feature of the present invention.

Figure 1:
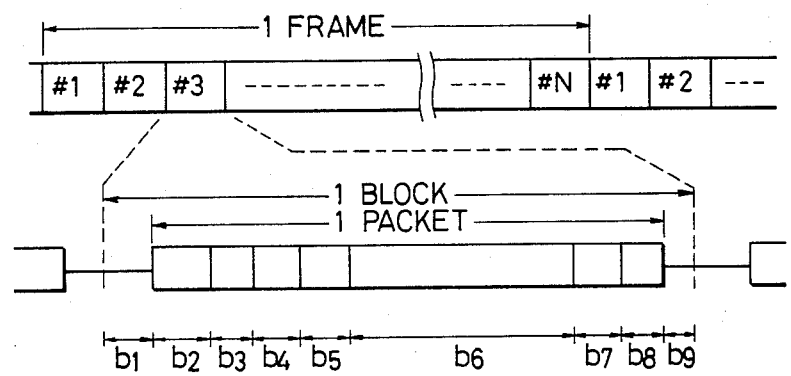
FIG. 1 shows an example of a signal configuration in which a frame cyclically repeated along the time axis is subdivided into a plurality of blocks so that signals are transmitted by the block in the digital signal transmission system.
Figure 2:
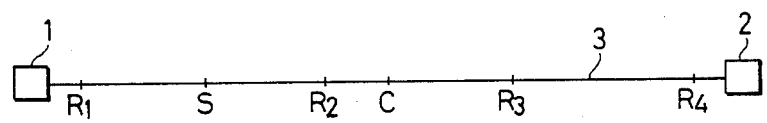
FIG. 2 is a schematic diagram illustrating the positional arrangement of stations on a cable.
Figure 3:
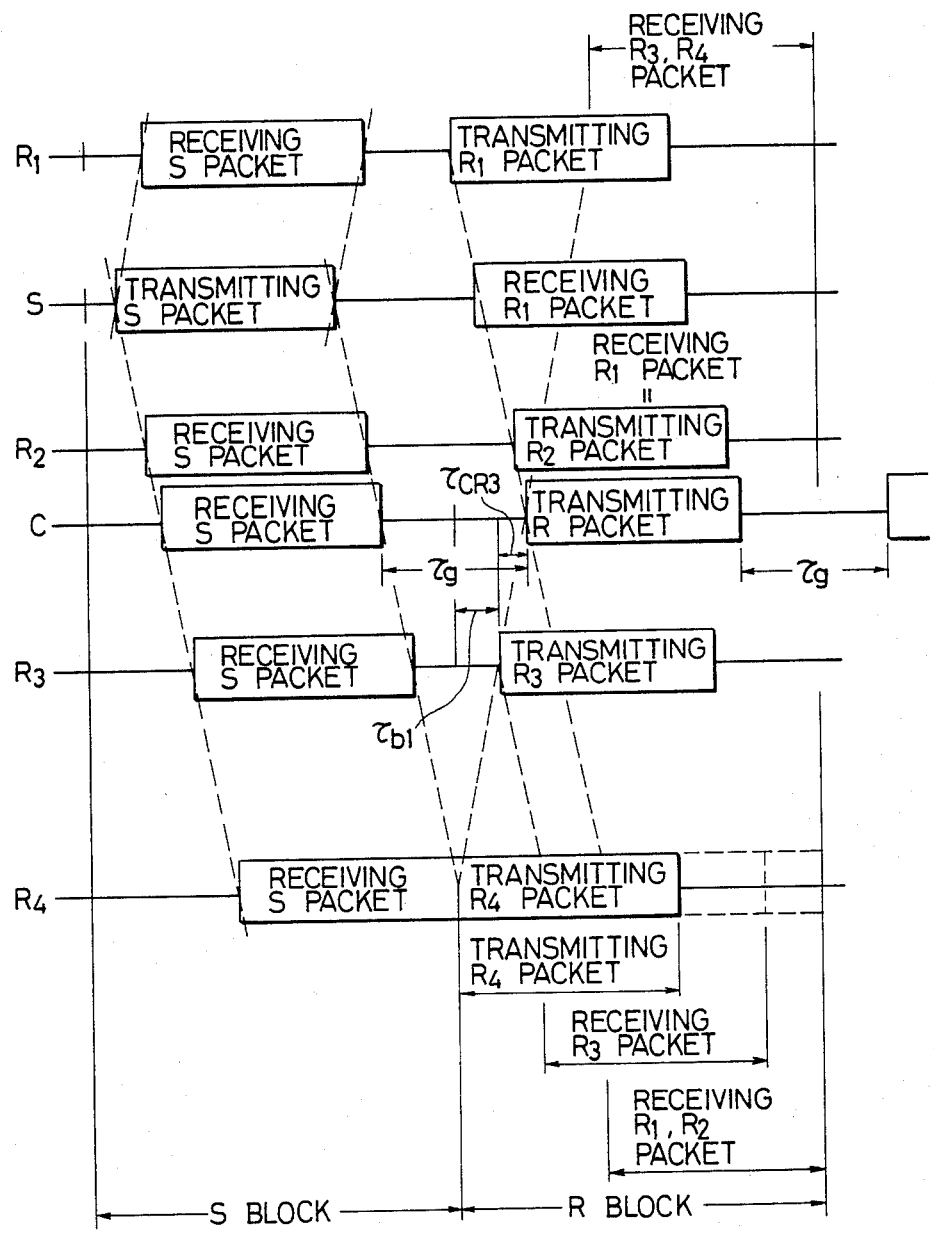
FIG. 3 is a time chart illustrating envelopes of signal waveforms of transmitting/receiving packets at the respective receiving points (taps) of the stations shown in FIG. 2.

In the above description, it has been assumed that the respective distances between the stations S, C and R or their user (terminal) equipments 5 and the corresponding taps $4_1$, $4_M$ and $4_N$ may be neglected. In some practical cases where a station is installed, there are frequent occasions when it is impossible to neglect the distance between the tap 4 and the station or its terminal equipment. In this case, in order to allow each station to effect transmitting/receiving of the packet signal with the timing as shown in FIG. 3, it is necessary to correct the signal propagation delay time corresponding to the distance between the tap and the station or its terminal equipment.

The correction may be done for each station on an individual basis. That is, a distance code corresponding to a tap of a station on the coaxial cable 3 may be assigned for the designation code of the station so that calculation is made without considering the forward guard time $\tau_{b9}$ as well as the distance. Then, the delay time ($\Delta t$) between the tap and the associated station or its user equipment is subtracted from the forward guard time $\tau_{b9}$ so as to obtain an input signal to the programmable timer corresponding to the difference time ($\tau_{b9} - \Delta t$). On the contrary, when a station transmits a packet, it will suffice to begin the transmitting operation at a time earlier than the normal transmission timing by the delay time $\Delta t$.

For example, in FIG. 3, in the case where the station R transmits a packet signal, and if the delay time $\Delta t$ is negligible, it may begin the transmitting operation at a time later than a predetermined block initiation time by the following backward guard time $\tau_{b1}$:

$$\tau_{b1} = \tau_g/2 - \tau_{CR3} \qquad (4)$$

When the delay time Δt cannot be neglected, the backward guard time $\tau_{b1}$ may be corrected in the following manner:

$$\tau_{b1} = \tau_g/2 - \tau_{CR3} - \Delta t \tag{5}$$

By simply correcting the forward guard time $\tau_{b9}$ and the backward guard time $\tau_{b1}$ with the delay time Δt, the signal waveform may be maintained in a normal relationship as shown at the top of FIG. 3. This means that the delay time Δt between a tap and a station connected thereto or its terminal equipment can be effectively neglected when the station side is viewed from the cable side. That is, since the problem of delay time Δt may be left to the care of the individual station by its intra-office treatment, it is possible in planning a communication system to definitely determine the assignment of a designation code for each station in accordance with the position of each tap.

Further consideration of practical cases of a communication system teaches that all stations are not always connected to a single communication cable through corresponding taps which are disposed on the single cable. If a communication cable which has one-dimensional spread and on which a plurality of taps are located is referred to as a main cable and another cable which branches from the main cable through one of the taps on the main cable is referred to as a branch cable, there are some cases where some stations are connected to such a branch cable through repeaters. Also, in such a communication system as above having a two-dimensional spread, the signal propagation delay time between a master station, which is a reference station with respect to the packet signal transmission timing, and each of all the other stations must be half of the above-mentioned guard time $\tau_g$. Such a communication system may be equivalently illustrated as shown in FIG. 5.

Figure 5:
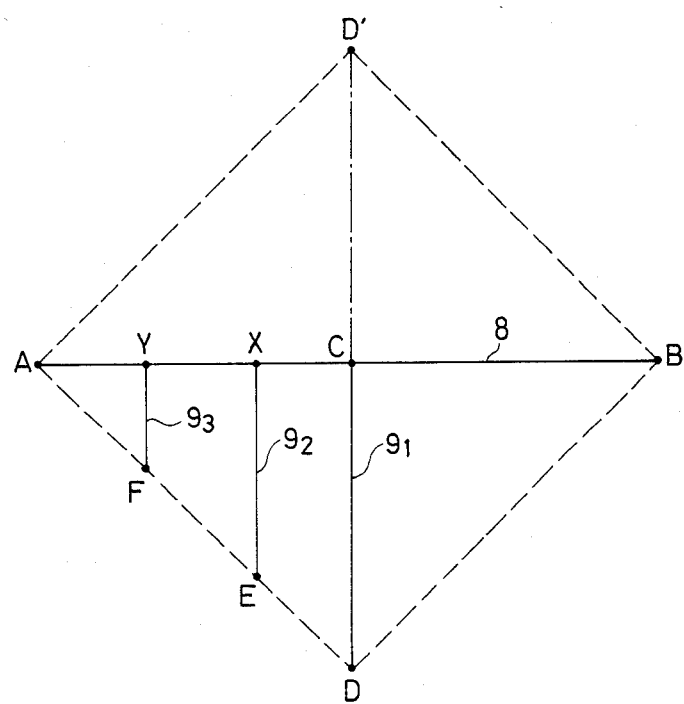
FIG. 5 is a diagram illustrating the communication system having a two-dimensional spread.

In FIG. 5, a plurality of taps A, B, C, X and Y are disposed on a main cable 8. Three branch cables $9_1$, $9_2$ and $9_3$ are connected between the tap C (which is assumed now as the timing reference) and a point D, between the tap X and another point E and between the tap Y and still another point F, respectively. Although these cables 8 and $9_1$ to $9_3$ are drawn in FIG. 5 as straight lines, in ordinary circumstances the cables may follow a curved path depending on conditions such as the arrangement of buildings or the like. In FIG. 5, however, the system arrangement is simply expressed as a model, by topologically observing only the signal propagation time.

In the illustrated model communication system, it is assumed that the signal propagation time along each of the distances AC and CB between the respective taps A and C and between the taps C and B are equal to one half of the guard time, i.e., $\tau_g/2$. In this case, the signal propagation time along the distance CD between the taps C and D is also equal to this value $\tau_g/2$. Accordingly, all the stations in this system must be within the area of a triangle ABD formed by connecting the points A, B and D. Further assuming here that the station C which is now regarded as a reference station is located at a position which is a negligible distance from the tap C, the packets transmitted from the respective stations must be equidistantly disposed when they arrive at the position where tap C is located. This is the same condition described with reference to the station C in FIG. 3.

In the communication system as shown in FIG. 5, such a condition may be satisfied in the following manner: (1) A distance code with respect to the main cable 8 as well as another distance code with respect to the branch cable $9_1$, $9_2$ or $9_3$ are both provided for the designation code of each station. For example, with respect to the main cable, the point A is regarded as a reference, and with respect to the branch cable, the branch point (where the tap C, X or Y is located) is regarded as another reference so as to provide a combination of two different distance codes with respect to main and branch cables. (2) The point in time when a packet is transmitted from each transmitting station is controlled such that such a predetermined time relation as shown in FIG. 3 may be obtained at the branching tap on the main cable 8 from which the branch cable of that transmitting station is branched.

Thus, each station on each of the branch cables $9_1$ to $9_3$ has, as its designation code, not only a distance code with respect to the tap position on the main cable 8 to which the associated branch cable is connected but also another distance code with respect to the distance between the above-mentioned tap position and the station in question on the associated branch cable. From the above description, it will be apparent that the principle of correction by using the delay time Δt, in the case where the distance between a tap and a station or its terminal equipment connected to the tap is not negligible, can be applied to such a communication system as mentioned above having branch cables as well as a main cable by introducing an additional distance code with respect to the branch cables $9_1$ to $9_3$.

In FIG. 5, the area within a triangle ABD' which is obtained by folding the triangle ABD symmetrically with respect to the segment AB is an available area for system extension, since it is possible to provide branch cables in either area of the two triangles which are sectioned by the main cable 8. Obviously, the area of triangle ABD is also available. From a topological view point, if the number of the branch cables is limited to three and even if each station is within the triangle ABD, the same designation code cannot be assigned for two or more stations without loss of generality. Further, if all of the stations are located within the triangle ABD, it is possible to cause the number of distance codes with respect to the branch cables to be one half of the number of distance codes with respect to the main cable since the maximum distance along any branch is only one half the length AB, Thus, in the case where a binary distance code is used as the designation code for each station, one bit can be eliminated from each code.

The change in the installation location of a station or its terminal equipment in a communication system to which the digital signal transmission system according to the invention is applied will now be discussed. There are some cases where the installation location is changed because of a change in the room layout, or the like, after the communication system is operational. In this case, it is necessary to change the designation code according to this invention because the designation code includes the distance code. This may be very inconvenient for the user. However, this problem can be solved by separately providing two different codes, one a user designation code which is to be used by the system user and another an actual designation code which is to be put into a packet. To this end, for example, a translation table between the user designation numbers and the actual designation numbers is stored in a memory, such as a ROM, which is provided at each station.

It is therefore unnecessary for the user to know the physical designation code. With this arrangement, when the installation location of any one station is to be changed, it will be sufficient to replace the stored translation table by a new one. In this system, however, even in the case of a change in the installation location of only one station, it is necessary to replace the translation tables at all stations. Accordingly it is more practical to store the translation table in a random access memory (RAM) which is provided in each station so that the translation table stored in the RAM at each station may be electronically reprogrammed in response to information about the change which is transmitted from a station which requires the change to all the other stations through comunication cables.

As discussed above, according to this invention, in a multistation communication network in which digital information transmitting/receiving operations are effected in a packet form in a time division multiplex mode by using a communication cable, a designation code is provided for definitely indicating the inter-station signal propagation delay time so as to enable frame synchronization, block synchronization and system timing to be easily established and with a higher degree of accuracy. A further advantage is that there is flexibility in the installation of stations, in changes in the installation locations or various stations or the like, and in extension of the system.

What is claimed is:

1. A digital signal transmission system of the type wherein a plurality of stations transmit and receive digital information in packet form in a time division multiplex mode over a communication cable, each of said plurality of stations including transmitting means for transmitting a packet of information having a designation code representing a signal propagation delay time between said each station and a reference position on said cable, receiving means at each station for detecting said designation code, and means for determining the transmission timing of each station in accordance with the detection of the designation code of another of said plurality of stations.

2. A digital signal transmission system according to claim 1, wherein each of said plurality of stations transmits said digital information at a digital transmission rate, the propagation delay time represented by each designation code being expressed as a number of unit delay periods, said unit delay period being substantially equal to the reciprocal of said digital transmission rate.

3. A digital transmission system according to claim 1, wherein said communication cable includes a main cable and at least one branch cable branched from said main cable at a branching position, said branch cable having at least one station connected thereto, the transmitting means at said at least one station transmitting a designation code including a first distance code representing the signal propagation delay time between said reference position and said branching position and a second distance code representing the signal propagation delay time between said branching position and the connection point of said at least one station to said branch cable.

4. A digital signal transmission system according to claim 1, wherein said means for determining determines said transmission timing in accordance with the detected designation code of another station and the propagation delay time between its own station and said reference point.

5. A digital signal transmission system according to claim 1 or 4, wherein said means for determining determines said transmission timing further in accordance with the signal propagation delay time from its own station to said communication cable.

6. A digital signal transmission system according to claim 1, further comprising translation table means at each station for providing the designation code of the associated station in response to an input address.

7. A digital signal transmission system according to claim 6, wherein said translation table means comprises a random access memory (RAM).

* * * * *